Dec. 11, 1923.
P. TENEROWICZ
1,476,933
MILK AND MAIL RECEPTACLE
Filed Aug. 7, 1922
2 Sheets-Sheet 1
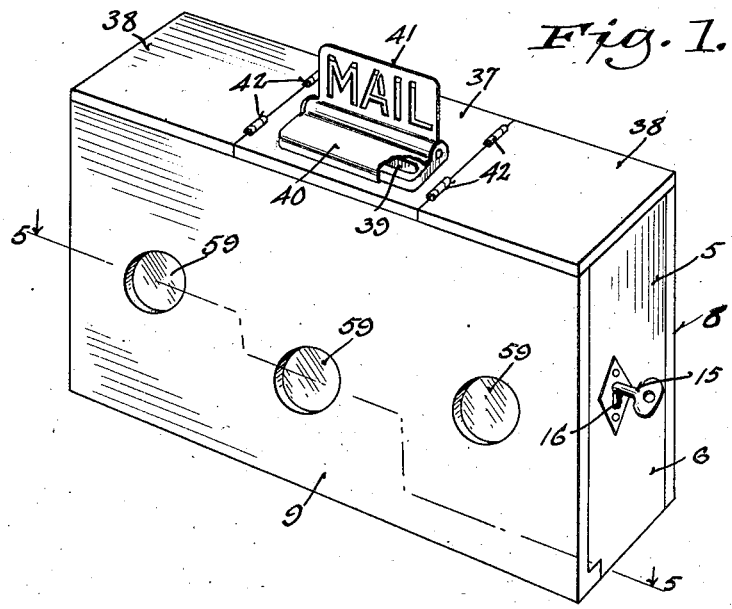
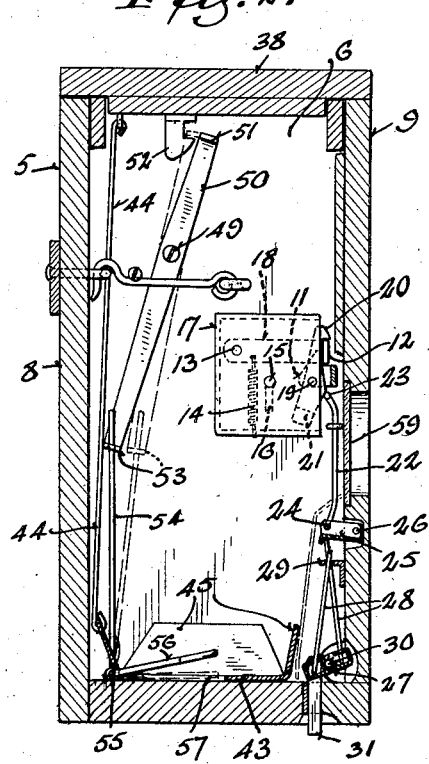
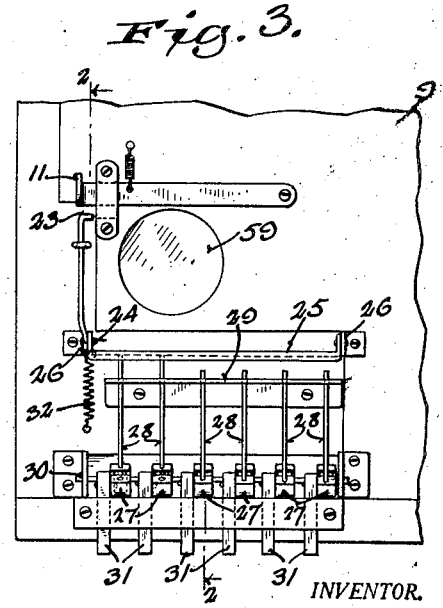
INVENTOR.
PETER TENEROWICZ
BY
Ira M. Jones.
ATTORNEY.

Dec. 11, 1923.

P. TENEROWICZ

MILK AND MAIL RECEPTACLE

Filed Aug. 7, 1922

INVENTOR.

PETER TENEROWICZ

BY

Ira M. Jones.

ATTORNEY.

Patented Dec. 11, 1923.

1,476,933

UNITED STATES PATENT OFFICE.

PETER TENEROWICZ, OF MILWAUKEE, WISCONSIN.

MILK AND MAIL RECEPTACLE.

Application filed August 7, 1922. Serial No. 580,168.

*To all whom it may concern:*

Be it known that I, PETER TENEROWICZ, a citizen of the Republic of Poland, and resident of Milwaukee, in the county of Milwaukee and State of Wisconsin, have invented new and useful Improvements in Milk and Mail Receptacles, of which the following is a description, reference being had to the accompanying drawings, which are a part of this specification.

This invention relates to certain new and useful improvements in milk and mail receptacles.

It is one of the objects of this invention to provide an improved device of the class described in which means are provided for preventing the unauthorized removal of milk or mail from the receptacle.

Another object of this invention resides in the provision of a receptacle having a mail receiving compartment, a milk receiving compartment and a butter or cream receiving compartment.

Another object of this invention resides in the provision of an improved means for locking the cover closing the opening through which the milk, cream or the like is inserted upon the placing of an article on the support mounted therein.

Another object of this invention resides in the provision of means whereby it can be readily ascertained as to whether any articles have been placed in any of the compartments of the device.

A still further object of this invention resides in the provision of an improved locking means whereby the key actuated lock is secured against opening movement without first operating the combination means.

And a still further object of this invention resides in the provision of an improved type of combination means whereby the manipulation of the wrong combination secures the lock connected therewith against opening movement.

With the above and other objects in view which will appear as the description proceeds, my invention resides in the novel construction, combination and arragement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a perspective view of a combination mail, cream and butter, and milk receptacle embodying my invention;

Figure 2 is a view taken through the receptacle on the plane of the line 2—2 of Figure 3;

Figure 3 is an enlarged fragmentary detail view of one corner of the door closing all of the compartments and illustrating the improved combination means for preventing the unauthorized release of the key actuated lock;

Figure 4:
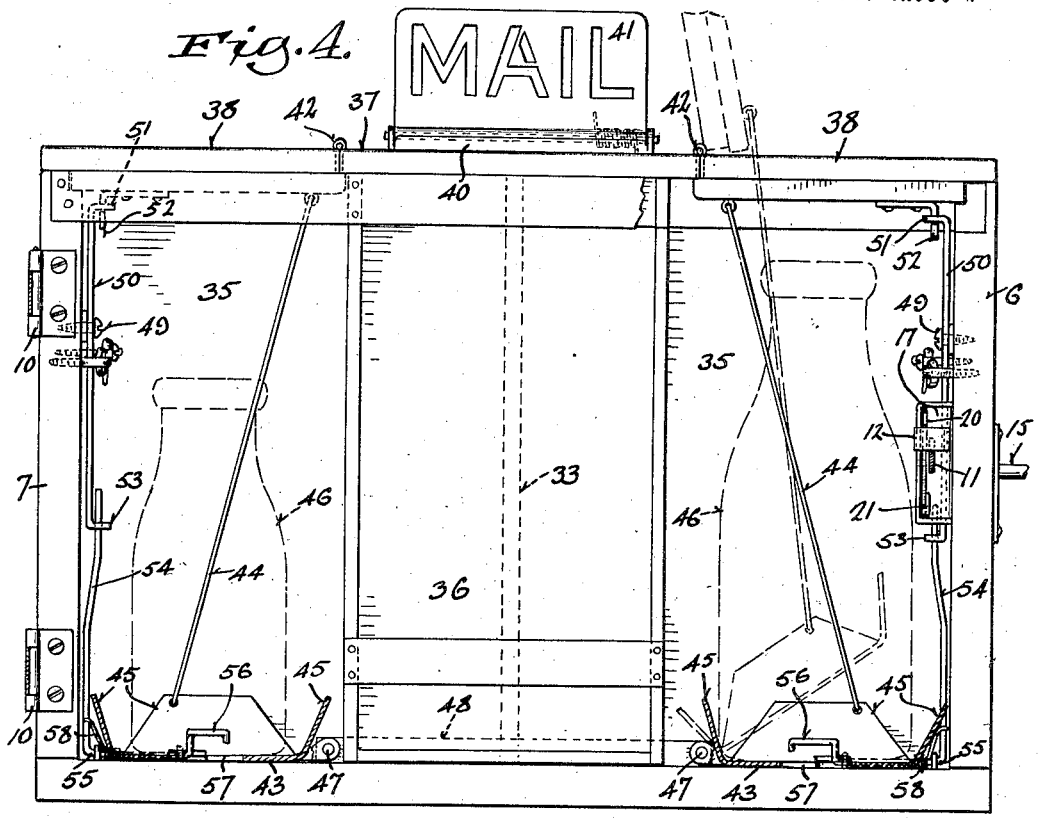
Figure 4 is a view of the improved receptacle with the door removed and the milk bottle hinged supports in section.

Referring now more particularly to the accompanying drawings in which like numerals designate like parts throughout the several views, the numeral 5 designates the receptacle proper which consists of side walls 6 and 7, a rear wall 8 and a door 9 removably closing the entire front of the receptacle.

The door 9 is preferably hinged to the end wall 7, as at 10, and carries a keeper 11 which is engageable by a latch member 12 carried by wall 6 to lock door 9 in closed position. The latch member is pivotally mounted as at 13, and is normally yieldably urged to a position engaged behind keeper 11 by a spring 14, the latch being movable to release or unlock the keeper by the insertion of a key 15 through the key way 16 in the housing 17 of the lock and rotating the same to engage the shank 18 of the latch member.

Pivotally mounted within the lock casing, as at 19, is a dog 20, the lower end 21 is weighted so as to normally position the head of the dog out of the path of the latch member and a means is provided which normally engages the weighted end of the dog, when the cover is in closed position, to engage its head over the latch member and prevent its actuation by manipulation of key 15.

The means for engaging the head of the dog over the latch member consists of a lever or rod 22 which is reciprocally mounted on the door and has its upper end 23 bent or directed inwardly to normally engage the lower end of the dog and has its lower end 24 pivotally engaged with one end of a transverse plate 25 which is pivotally secured to the door, as at 26. Pivotally mounted beneath plate 25 are a plurality of rocker members 27, the ends of which are apertured to receive the lower ends of rods 28, the upper ends of which are slidably mounted in apertures in a guide rail 29 and are engageable with the under face of plate 25. The rocking members are mounted on a common shaft 30 and are spring urged to have their outer ends above the plane of the inner ends, as best illustrated in Figures 2 and 3 and as will be readily obvious, the rods having their lower ends engaged in the upper or outermost ends of the rocking members will hold the outer free end of plate 25 in raised position to engage the upper end of rod 22 against the dog and then engage the head thereof over the latch member, as best illustrated in Figure 2.

The inner or lower ends of the rocking members have rods or actuating finger members 31 pivotally connected therewith which pass outwardly through the bottom ledge of the door and as will be obvious a movement into the interior of the receptacle of all members 31 connected with the rocking members having rods engaged with their outer raised ends will permit the downward movement of the outer free end of plate 25 under action of a spring 32 to thus disengage end 23 of rod 22 from the weighted end of the dog and permit the unlocking of the latch member by rotation of key 15.

As illustrated in the drawings, the combination is such that a movement of the two members 31 into the container, to the left with reference to Figure 3 will permit the unlocking of the device and a movement into the receptacle of any of the other members 31 will raise the rod 28 engaged therewith and thus prevent movement of plate 25 by spring 32, as will be readily obvious.

Figure 5:
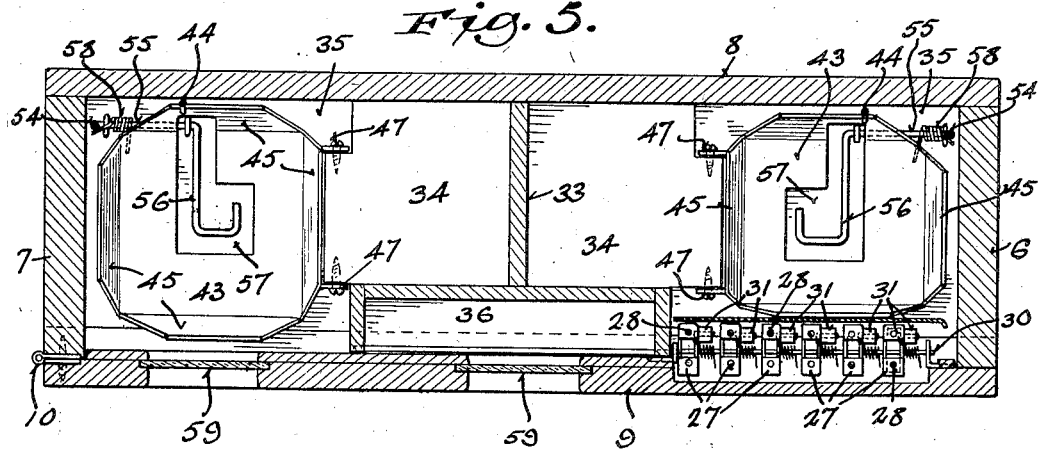
Figure 5 is a central view taken through Figure 1 on the plane of the line 5—5.

As best illustrated in Figures 4 and 5, a vertical central partition member 33 divides the interior of the receptacle into two main compartments which are divided into cream or butter receiving compartments 34 and milk receiving compartments 35 and a mail receiving box 36 has its back wall abutting the outer edge of partition 33 and its front closed by the door 9. The top of the receptacle is formed by a fixed central portion 37 and two end trap doors 38, the fixed part 37 having a slot or recess 39 therein registering with the interior of the mail box to permit the insertion of mail therethrough. The opening 39 is normally closed by a hinged cover 40 which is spring urged to closing position and has a suitable plate 41 thereon bearing the designation "Mail."

Each cover 38 is hingedly mounted, as at 42, and is connected with a bottle support or rest 43 by a connecting link or rod 44. Support 43 is formed from sheet metal and has the sides thereof struck upwardly, as at 45, to form a recess into which a milk bottle 46 may be nested and prevented from movement thereoff. Each rest 43 is pivotally connected, as at 47, to a floor member 48 to which the lower end of partition 33 and mail box or compartment 36 is secured so that a movement to open position of either of the covers 38 will raise the support 43 connected therewith as illustrated by dotted lines in Figure 4.

With this construction it will be obvious that when a bottle of milk is placed in any of the compartments 35, the weight of the bottle automatically moves the door 38 thereof to closed position and in order to prevent the unauthorized removal of the milk I provide means for automatically locking the door 38 in closed position upon the support 43 reaching its normal position.

Pivotally secured to each end wall, as at 49, is a lever 50, the upper end of which is directed laterally to provide a latch member 51 for engagement behind a keeper 52 carried by the adjacent door 38. The lower end of each lever 50 is directed laterally, as at 53, and apertured to slidably receive the upper end of a rod 54, the lower portion of which is directed laterally, as at 55, and pivotally secured to the floor of the adjacent compartment and the extreme end of which is directed laterally to form a crank or lever 56 which normally projects above the surface of the adjacent rest 43 through an opening 57 therein. End 56 is normally urged to its position projecting through opening 57, and latch member 51 consequently normally held from engagement behind keeper 52, by a spring 58.

From the above it will be readily apparent that upon the insertion into the interior of any compartment 35 of an article, the weight thereof will automatically close the door 38 and when the door, and consequently rest 43 connected therewith, approaches closed position, the weight of the article depresses lever 56 against the force of spring 58 and rocks lever 50 on its pivot engaging the latch member behind keeper 52. With either of the doors 38 locked, it is then necessary that the main door 9 be opened before the article can be removed. For convenience in ascertaining whether it is necessary to open door 9, a window 59 is formed in the door 9 adjacent each compartment.

What I claim as my invention is:

1. In a device of the character described, a receptacle having a compartment, a hinged closure for the compartment, a support hingedly mounted in the compartment, means connecting the closure and support whereby they are conjointly moved on their hinges, a lever having one end pivotally secured in the compartment and its other free end normally raised above the bottom thereof in register with an opening in the bottom of the support whereby the placing of an article on the support depresses the free end of the lever, and means actuated by the depressing of the lever to secure the closure in closed position.

2. In a device of the character described, a receptacle having a compartment, a hinged closure for the compartment, a support hingedly mounted in the compartment, means connecting the closure and support whereby they are conjointly moved on their hinges, a lever having one end pivotally secured in the compartment and its other free end normally raised above the bottom thereof in register with an opening in the bottom of the support whereby the placing of an article on the support depresses the free end of the lever, a keeper carried by the closure, a latch member engageable with the keeper, and a connection between the latch member and lever whereby depressing of the lever engages the latch member with the keeper to secure the closure in closed position.

3. In a device of the character described, a receptacle having a compartment, a hinged closure for the compartment, a support hingedly mounted in the compartment, means connecting the closure and support whereby they are conjointly moved on their hinges, a lever having one end pivotally secured in the compartment and its other free end normally raised above the bottom thereof in register with an opening in the bottom of the support whereby the placing of an article on the support depresses the free end of the lever, a keeper carried by the closure, a latch member engageable with the keeper, a connection between the latch member and lever whereby depressing of the lever engages the latch member with the keeper to secure the closure in closed position, and means disengaging the latch member and keeper upon the removal of the article from the support.

In testimony whereof I affix my signature.

PETER TENEROWICZ.